UNITED STATES PATENT OFFICE.

ROBERT C. SCHÜPPHAUS, OF BROOKLYN, NEW YORK.

PYROXYLIN COMPOUND.

SPECIFICATION forming part of Letters Patent No. 600,556, dated March 15, 1898.

Application filed June 30, 1897. Serial No. 642,960. (No specimens.)

*To all whom it may concern:*

Be it known that I, ROBERT C. SCHÜPPHAUS, of Brooklyn, New York, have invented certain new and useful Improvements in Pyroxylin Compositions and in the Manufacture of such Compositions, of which the following specification is a full, clear, and exact description.

The present invention relates to the use of certain alkyloxids or ethers in pyroxylin compounds. These new substances—*i. e.*, new in this art—are valuable not only for their solvent properties in respect to the pyroxylin when combined with a suitable adjuvant—such, for instance, as ethyl alcohol—but also for their comparative lack of volatility. This latter property enables the operator to carry out the mastication of the composition between rolls with a smaller quantity of volatile liquid solvent than would otherwise be necessary. The specific functions which I have mentioned are possessed, I have discovered, by the ethers of propyl and butyl alcohols and by certain other substances which I will point out below. With these and the related substances the higher we go in the range of boiling-points the more of such liquid solvent (being proportionally less volatile) remains in the finished product. In this way in addition to the functions I have already mentioned the percentage or proportion of solid solvent or solvents required may be reduced to a minimum. A perfectly satisfactory composition of pyroxylin containing no more than fifteen per centum, by weight, of camphor may, as an instance, be produced in this manner. For this particular purpose I prefer anisol, phenetol, and related ethers. Anisol or methylphenyl oxid (boiling-point 152° centigrade) and its next higher homologue, phenetol or ethylphenyl oxid (boiling-point 172° centigrade,) when either of them is dissolved in ethyl alcohol, gelatinate soluble pyroxylin with ease. So, also, do the solutions of camphor and the acetotoluids in anisol or phenetol. Ethers of the mixed aliphatic-aromatic type of more complex structure than anisol or phenetol—as, for instance, guiacol, $(C_6H_4-OCH_3, OH,)$ boiling-point 200° centigrade—still have this property; but the easily-accessible ethers of the naphthols, beta-naphthylethylether, for instance, which is a solid melting at 37° centigrade, possess neither the property of gelatinating soluble pyroxylin in alcoholic solution nor in combination with camphor. Nevertheless an aceton solution of soluble pyroxylin containing thirty-seven per centum of beta-naphthylethylether to the amount of pyroxylin, by weight, leaves, on drying down, a perfectly transparent exceedingly hard film.

While it is evident, therefore, that closely-related substances (related in the chemical sense, of course) are the equivalents of the substances I have specifically named, it also necessarily follows that the probable range of chemical equivalents of these substances in pyroxylin compositions by the substitution of other radicals in the substances I have named is considerable.

In the foregoing I have, however, pointed out what I have found to be the best substances for the purposes named and directed the attention of chemists to the range of substitutes therefore, and I therefore claim and desire to secure by these Letters Patent—

1. A pyroxylin composition containing one or more of the following substances: propylether, butylether, anisol, phenetol, substantially as described.

2. In the manufacture of pyroxylin compositions, acting upon the pyroxylin by a member of the group of substances characterized by propylether, butylether, anisol, phenetol, substantially as described.

In testimony whereof I have hereunto set my hand this 15th day of May, 1897.

ROBERT C. SCHÜPPHAUS.

Witnesses:
 GEORGE H. SONNEBORN,
 HAROLD BINNEY.